United States Patent [19]
Traino et al.

[11] Patent Number: 4,746,987
[45] Date of Patent: May 24, 1988

[54] MODULATOR CONTROL FOR AUTOMATICALLY OVERCOMING INTENSITY VARIATIONS IN A LASER SCANNER

[75] Inventors: James C. Traino, Fairport; Leon C. Williams, Penfield; Kwok-leung Yip, Webster; J. Terrence Flynn, Fairport, all of N.Y.

[73] Assignee: Xerox Corporation, Stamford, Conn.

[21] Appl. No.: 865,321

[22] Filed: May 21, 1986

[51] Int. Cl.⁴ .............................................. H04H 1/04
[52] U.S. Cl. .................................... 358/285; 358/293; 358/297
[58] Field of Search ............... 358/285, 208, 206, 199, 358/297, 296; 250/578, 237

[56] References Cited

U.S. PATENT DOCUMENTS

| | | | |
|---|---|---|---|
| 3,579,145 | 5/1971 | Lange | 332/7.51 |
| 3,787,887 | 1/1974 | Burton | 346/108 |
| 4,068,197 | 1/1978 | Yamazaki et al. | 331/94.55 |
| 4,367,926 | 1/1983 | Hoiiki | 350/358 |
| 4,429,218 | 1/1984 | Thomas | 250/214 R |
| 4,460,249 | 7/1984 | Vincent | 350/356 |
| 4,584,612 | 4/1986 | Ono | 358/285 |

FOREIGN PATENT DOCUMENTS 1369114 10/1974 United Kingdom .
1515606 6/1978 United Kingdom .
2134351 8/1984 United Kingdom .

Primary Examiner—Edward L. Coles, Sr.
Attorney, Agent, or Firm—Frederick E. McMullen

[57] ABSTRACT

A scanner with high intensity source beam, a modulator for modulating the source beam to provide a zero order beam and first order writing beam in response to an image signal input, a polygon for scanning the writing beam across a moving recording member to write images thereon, a sensor in the path of the zero order beam providing a first black beam intensity signal while scanning between pages and a second white beam intensity signal while the writing beam scans an image background area, a circuit for differencing the first and second beam intensity signals from one another to provide a composite intensity signal representing the intensity of the source beam, and a second circuit for differencing the composite beam intensity signal from an intensity setpoint signal to provide a correction signal for adjusting the rf power to the modulator to maintain a substantially constant writing beam intensity.

In a second embodiment, the correction signal is determined by a successive approximation register.

10 Claims, 4 Drawing Sheets

MODULATOR CONTROL FOR AUTOMATICALLY OVERCOMING INTENSITY VARIATIONS IN A LASER SCANNER

The invention relates to an automatic exposure control for controlling scanning beam intensity, and more particularly, to an automatic exposure control method and apparatus for stabilizing the intensity of the scanning beam by controlling modulator power.

One of the limiting factors in the design of rastor output scanners is the bandwidth of the acousto-optic modulator typically used to modulate the scanning beam in response to the image input signals as the beam is swept by a mirror element such as a polygon across the scanner recording member. Here, the effective bandwidth of the modulator is the frequency operating range over which the intensity of the scanning beam has minimal acceptable variation. Usually a range of intensity variation of approximately 10 percent is considered to be acceptable and this range is normally used to define the usable bandwidth of the modulator. Thus, the maximum video input rate of the scanner is determined by the modulator usable bandwidth. If facet tracking of the polygon is employed, additional amounts of bandwidth must be subtracted, reducing the limited amount of usable bandwidth available.

Further, operating inefficiencies and losses such as mismatch of Bragg condition, attenuation of acoustic propagation, transducer conversion loss, and the rf driver frequency response can result in beam intensity loss, and each of these is frequency dependent with consequent further erosion of available bandwidth.

If one could compensate the system for changes in beam intensity and maintain the diffraction efficiency of the modulator, which is frequency dependent, substantially constant, the loss of bandwidth could be prevented. Such compensation may be accomplished by applying additional power as the response rolls off, but in order to have useful compensation, the power driver must be precisely matched with the individual modulator used with the scanner, a relatively costly and time consuming requirement.

To avoid this, the invention provides a method for stabilizing the intensity of a scanning beam emitted by a light source and modulated by a modulating means in accordance with an image signal input by controlling the rf power to the modulating means to maintain uniform diffraction efficiency of the modulating means despite changes in beam intensity and without requiring that the power driver be matched with the individual modulating means, comprising the steps of: detecting the intensity of the beam during scanning to provide an intensity signal; comparing the detected intensity signal with a preset beam intensity setpoint potential to provide an intensity correction signal; and later combining the intensity correction signal with the image signal input to continuously adjust the rf power to the modulating means so as to maintain uniform diffraction efficiency while modulating the beam in accordance with the image signals.

The invention further relates to a control for maintaining uniform diffraction efficiency of a modulator which modulates the scanning beam used for scanning a recording member of a rastor output printing apparatus to expose the recording member in response to an image signal input, the control controlling the rf power to the modulator to stabilize the intensity of the scanning beam, comprising, in combination: beam intensity detecting means for detecting the intensity of the scanning beam, the beam intensity detecting means producing an intensity signal representative of the detected beam intensity; means providing a preset reference potential; comparator means for comparing the intensity signal with the reference potential to provide a correction signal; and circuit means for combining the image input signal with the correction signal to provide a modified image input signal for regulating the modulator rf power level to maintain the intensity of the scanning beam substantially constant.

IN THE DRAWINGS

Figure 1:
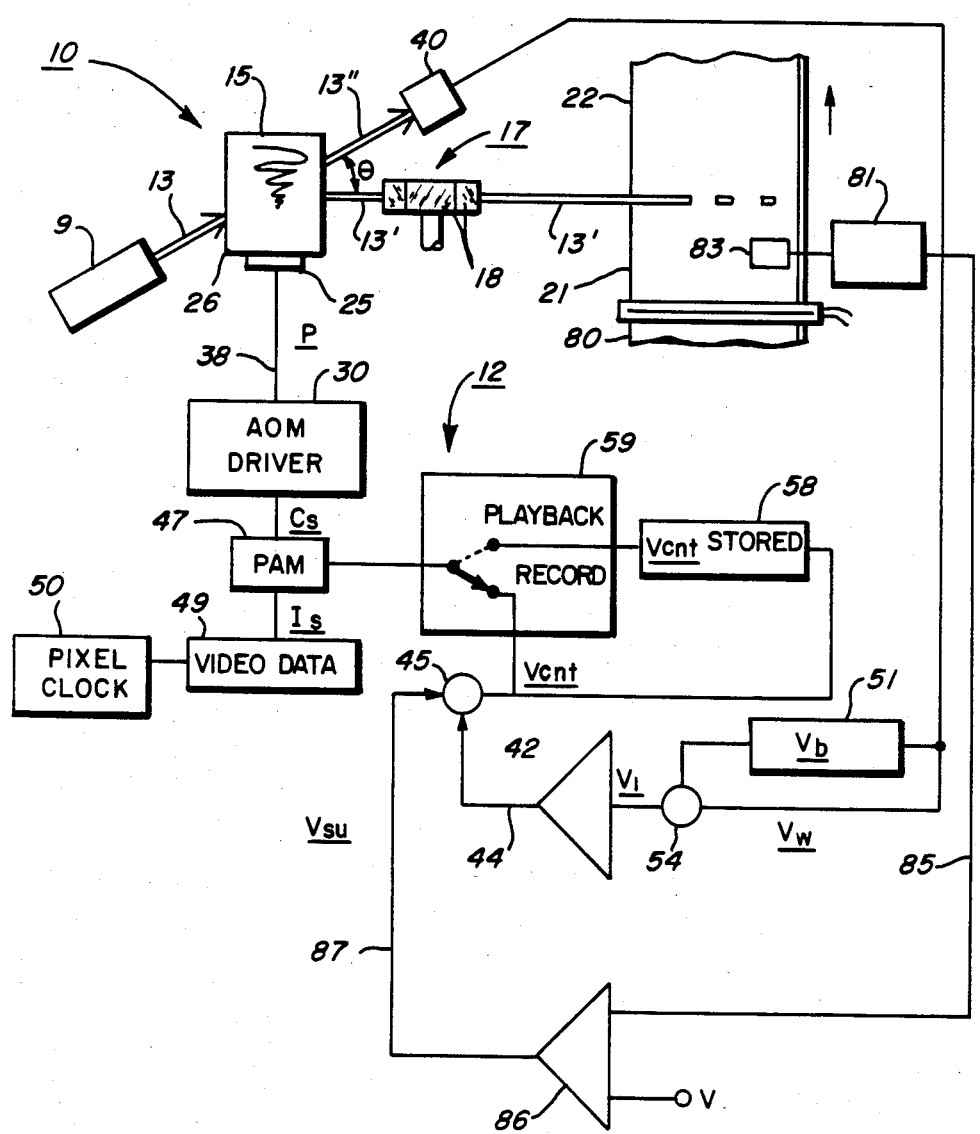
FIG. 1 is a schematic view of a raster output scanner incorporating the automatic exposure control of the present invention for stabilizing scanning beam intensity in response to scanner operating conditions.

Referring to FIG. 1 of the drawings, an exemplary raster scanner 10 is thereshown. Scanner 10 includes a suitable source of high intensity light such as a laser 9. The beam 13 of light output by laser 9 is passed to an acousto optic modulator 15 which modulates both the video, i.e. the on/off, and the intensity of beam 13 as will appear. From modulator 15, the now modulated beam, referred to as write beam 13', is passed to a scanning element, herein illustrated in the form of a rotating polygon 17. Polygon 17 sweeps the modulated beam impinging on the facets 18 thereof across the photosensitive surface 21 of a moving recording member 22, shown here in the form of a xerographic belt of a conventional xerographic system (not shown). Suitable optical elements may be interposed in the beam optical path to guide and/or focus the beam onto the surface 21 of the recording member 22 and provide the requisite beam dimension as will be understood. And while a belt type recording member is shown and described, other recording member types such as a drum may be contemplated.

As used herein, the term "light" refers to an electromagnetic radiation in the visible, ultraviolet, and infrared portions of the electromagnetic system.

Acousto optic modulator 15, which is of conventional design and construction, comprises an electrically driven piezoelectric transducer 25 acoustically coupled to an acousto-optical crystal 26. Transducer 25 generates an acoustic wave in response to an electrical signal which travel through the crystal 26 perturbing the index of refraction and acting as a phase grating, the grating period being equal to the drive or acoustic frequency with grating density being proportional to the amplitude of the drive signal applied thereto.

When operated in the Bragg type reflection region, as will be understood by those skilled in the art, where no signal is applied to transducer 25, only the nondefracted or zero order beam 13" exists. Application of a predetermined signal level to transducer 25 defracts the beam 13 at an angle θ to produce a defracted first order or write beam 13'. In addition, by varying the acoustic power applied, modulator 15 acts to modulate the intensity of the defracted beam 13' as will appear.

Figure 2:
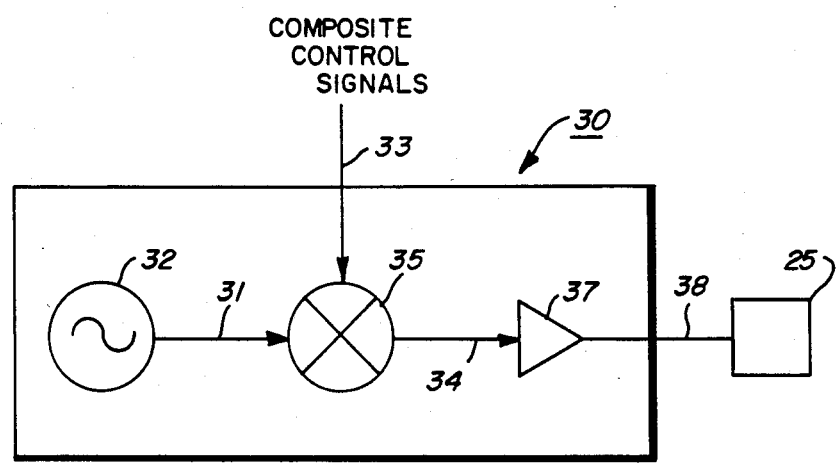
FIG. 2 is a view showing details of the single port r.f. driver of the modulator shown in in FIG. 1.

To drive modulator 15, a single port r.f. driver 30 is provided. Referring to FIG. 2, driver 30 includes a fixed or varying frequency signal source 32. Signal source 32 outputs a signal of constant amplitude and constant or varying frequency through line 31 to a linear balanced mixer 35. There, the r.f. signal is mixed with a composite video image and the beam intensity control signal input to linear balanced mixer 35 through line 33. The output signal of mixer 35 to line 34 is amplified by amplifier 37 and output through line 38 to transducer 25 of modulator 15. As will be understood, linear balanced mixer 35 is an analog device which enables the r.f. signal output of signal source 32 to the modulator 15 to be continuously controlled.

Figure 3A:
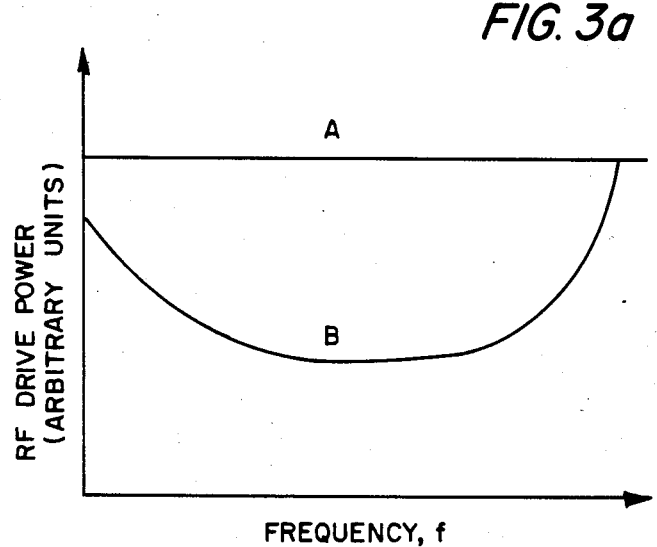
FIG. 3a is a graphical representation comparing frequency with r.f. driver power for the modulator shown in FIG. 1
Figure 3B:
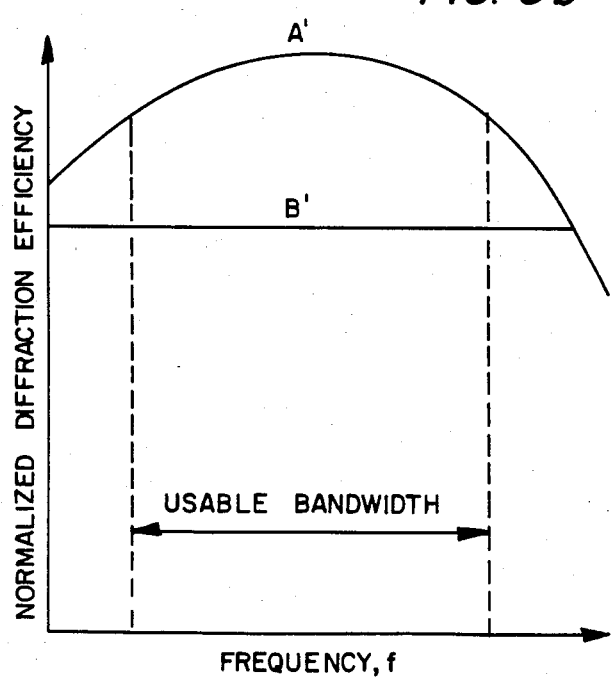
FIG. 3b is a graphical representation comparing frequency with normalized diffraction efficiency for the modulator shown in FIG. 1.

Referring now to FIGS. 3a and 3b of the drawings, when an acousto-optic type modulator such as modulator 15 is driven by a constant rf power as shown by curve A in FIG. 3a, the diffraction efficiency of the modulator and hence the intensity of the image beam falls off asymmetrically with change in frequency as demonstrated by curve A' of FIG. 3b. For applications of this type, the usable bandwidth is generally considered to lay in a range where the intensity of the write beam varies by no more than 10%. Accordingly, the maximum rate at which the image signals can be processed by the modulator is limited by the limited usable bandwidth available.

If in addition the write beam is to be facet tracked on the polygon, which is effected by varying the carrier frequency of the rf, an additional portion of the limited bandwidth must be used. Additionally, the intensity of the write beam is also adversely affected by mismatch of Bragg condition, attenuation of acoustic propagation, transducer conversion loss, and the rf driver frequency response, each of which is frequency dependent in an effort to avoid or at least minimize the intensity variations of the image beam shown by curve A' of FIG. 3b, the automatic exposure control of the present invention, identified generally by the numeral 12, varies the rf drive power to the modulator as shown by curve B in FIG. 3a in order to obtain a flat response in write beam intensity over a wide bandwidth as shown by curve B' in FIG. 3b.

The frequency dependent power function (Prf) of a modulator can be expressed as follows:

$$Prf = Pa(f)/(Ta(f))(TA(f)(Td(f))$$

where
Pa is the acoustic power required to maintain a given constant level of diffraction efficiency;
Ta is the transfer function of acoustic attenuation;
TA is the transfer function of loss in transducer 25;
Td is the transfer function of the rf driver 32; and
(f) is frequency.

Variations in the transfer functions Ta, TA, and Td can result from the Voltage Standing Wave Ratio (VSWR) input to the modulator driver 30, the output VSWR of driver 30, the length of the coaxial cable between driver 30 and modulator 15, the gain vs. frequency transfer functions of the major operating components of driver 30, any alignment errors between beam 13 and modulator 15, etc.

Returning to FIG. 1, automatic exposure control 12 employs a 'set point' or intensity adjustment potential Vsu (to be described later) to set the intensity of the write beam 13' which exposure control 12 will try to maintain. The current intensity of write beam 13' is represented by a beam intensity signal Vi, obtained from a photodetector 40 placed in the path of the zero order or non-write beam 13". In this application, photodetector 40 conveniently serves to replace the beam stop normally used to intercept and absorb non-write beam 13".

Since modulator 15 is operated in the Bragg reflection region, the sum of the zero order or non-write beam 13" and the first order or write beam 13' can be treated as a constant. To obtain Vsu, a voltage proportional to this constant, which represents the output intensity of laser 9 and which is referred to as a black line intensity signal Vb, is measured by photodetector 40 and stored in a memory 51. Vb is obtained during the inter-page gap 53 (shown in FIG. 4) when write beam 13' is off and totally "black" scan lines are generated in response to the absence of an image signal. Thereafter the intensity of the zero order or non-write beam 13" during imaging, referred to as the white line intensity signal Vw, is obtained as will appear below. The zero order or non-write beam 13" may include any minus orders such as the minus first order beam for improved accuracy. The black line intensity signal Vb and white line intensity signal Vw obtained are differenced by a suitable differencing circuit 54 to provide the beam intensity signal Vi, representing the intensity of the first order or write beam 13'.

Obtaining white line intensity signal Vw from the zero order beam 13" during imaging requires that there be generated a totally "white" scan line or partial scan line, that is, a line or at least a portion of a line in which the write beam 13' is continuously on if laser beam writing intensity variations across the scan line are to be accurately sensed. As will be understood however, this is not possible during scanning of recording member 22 since modulation of the write beam 13' by modulator 15 in accordance with the image signal input would result in unpredictable intensity sampling with unacceptable exposure leveling. Accordingly, the white line intensity signal Vw is derived from the white scan line or scan line portion which is typically generated in the period preceding the leading edge of each image.

Figure 4:
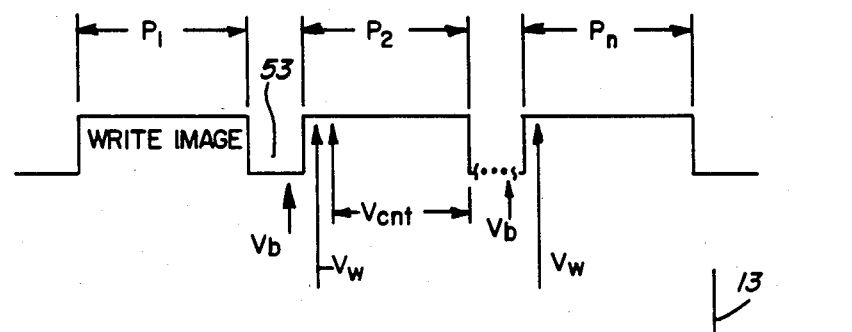
FIG. 4 is a schematic view of an image line series.

FIG. 4 illustrates a series of pages P1, P2, . . . Pn. As can be seen, there is a non-image portion, referred to herein as gap 53, before each image page is scanned on recording member 20. During gap 53, and with playback/record switch 59 (FIG. 1) set in the recored mode, the black image intensity signal Vb, which is proportional to the intensity of beam 13, is obtained and stored in memory 51. Following gap 53 in the period before start of the image, one or more calibration scans are made to obtain white line intensity signal Vw.

Returning to FIG. 1, the beam intensity signal Vi output by differencing circuit 54 is amplified by a suitable amplifier 42 and the amplified signal output through feedback loop 44 to a second differencing circuit 45. Circuit 45 differs the set point potential Vsu from write beam intensity signal Vi to provide an intensity correction signal Vcnt which is stored for the next image in a suitable memory 58. A dual mode playback/record switch 59 for placing exposure control 12 in either a recording mode to obtain the correction signal Vcnt or in a playback mode to utilize the correction signal Vcnt to correct laser intensity is provided.

In operation of automatic exposure control 12, during calibration, switch 59 is placed in the recording mode shown by solid lines in FIG. 1 and one or more black lines are scanned to obtain black line intensity signal Vb which is held in memory 51. Thereafter, one or more "white" scan lines are scanned to provide white line intensity signal Vw which is concurrently differenced from the black line intensity signal Vb output of memory 58 to provide write beam intensity signal Vi. After amplification, write beam intensity signal Vi is differenced from the set point potential Vsu by differencing circuit 45 to provide intensity correction signal Vcnt. Correstion signal Vcnt is stored in memory 58.

During scanning of the image, playback/record switch 59 is moved to the playback position shown in dotted lines and the previously recorded correction signal Vcnt in memory 58 is input to a a sutiable circuit such as the pulse amplitude modulating (PAM) circuit 47 shown and described in U.S. Pat. No. 4,400,740, issued on Aug. 23, 1983 to James C. Traino et al and incorporated by reference herein. Circuit 47 combines the intensity correction signal Vcnt from memory 58 with the image signal input is from the image signal source 49 to provide a modulator power control signal Cs to mixer 35 of driver 30 which in turn outputs a combined intensity/image signal/rf power signal P to transducer 25 of modulator 15. The intensity correction signal Vcnt cancels out intensity variations of laser writing beam 13' within each scan line during subsequent scanning of the image on recording member 22 to automatically correct for laser writing beam intensity variations during scanning. The foregoing process is preferably repeated for each page P1, P2, . . . Pn scanned.

To enhance accuracy, a series of scan correction signals (Vcnt) are obtained at convenient points across the scan line, i.e. at every 100 pixels. For that purpose, a suitable addressing circuit 57 is provided to write into memory 58 a sequence of intensity correction signals Vcnt−1, Vcnt−2, . . . Vcnt−n obtained during calibration. This is done by comparing the black intensity signal Vb, previously obtained and held in memory 58, with a series of white intensity signals Vw from various points along the scan line and comparing the beam intensity signals Vi obtained with set point potential Vsu. Later, as each image line is scanned, addressing circuit 57 addresses memory 58 to read out the correction signals Vcnt−1, Vcnt−2, . . . Vcnt−n in timed relation with the image signal input to provide a specific matching intensity correction signal for each block of pixels that comprises the scan line. To synchronize operation of addressing circuit 57 with the image signal input, circuit 57 is driven by pixel clock 50

The transfer function of the closed loop system shown in FIG. 1 is shown by the following relationship:

$$V(iwb)/Vsu = (M(s))(D(s))/1 + (M(s))(D(s))(K1),$$

where:
 V(iwb) is the signal output of photodetector 40;
 Vsu is the intensity adjustment potential;
 K1 is the gain in the feedback loop 44;
 D(s) is the transfer function of the photodetector 40;
 M(s) is the combined transfer function of Ta, TA, and Td; and (s) represents the Laplacian function.

Automatic exposure control 12 will hold the intensity of write beam 13' relatively constant at the level determined by the set point potential Vsu. Vsu may be set to the desired intensity adjustment potential manually, or as will appear more fully, automatically in response to the operating conditions of scanner 10 as will appear.

As will be understood, operational changes occurring in scanner 10 due primarily to wear and tear on the scanner components, misadjustments, dirt contamination, etc. may also effect the quality of the image output by scanner 10. The automatic intensity control 12 of the present invention permits those operational changes that occur during use and over the life time of scanner 10 that are susceptible to accommodation through adjustment of the intensity of beam 13 to be made.

To enhance accuracy, the set point potential Vsu is responsive to the charging conditions of recording member 22 which as will be understood by those skilled in the xerographic arts may change with aging of the recording member, wear of the charge corotron 80, etc. Referring to FIG. 1, a suitable charge sensor such as an electrostatic voltmeter 81 is used to monitor recording member charge conditions, probe 83 of voltmeter 81 being disposed in predetermined spaced operative relation with the photosensitive surface 21 of recording member 22 downstream of charge corotron 80 to measure the charge on recording member 22. The output of voltmeter 81 is fed via line 85 to one input of a comparator 86. A second input of comparator 86 is coupled to a predetermined reference potential V. The output of comparator 86 to line 87 comprises the set point potential Vsu and represents a comparison of the current charging condition of recording member 22 relative to the desired charging condition as represented by the reference potential V.

Figure 5:
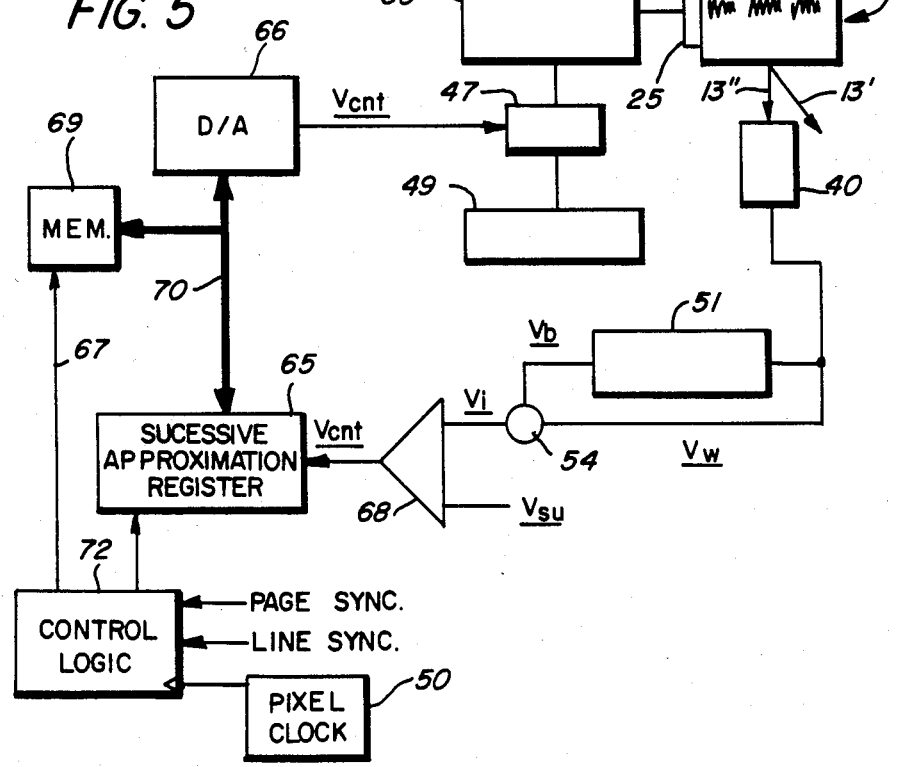
FIG. 5 is a schematic view of an alternate embodiment in which a successive approximation register is employed to determine the beam intensity correction factor.

In the embodiment shown in FIG. 5, where like numbers refer to like parts, a successive approximation register 65 is used to search out a digital word that represents the desired intensity of write beam 13'. To enhance accuracy, the scan line is divided into a series of n segments, and a specific word is determined for each line segment.

In this embodiment, a comparator 68 is provided for comparing the current beam intensity potential Vi output by differencing circuit 54 and the intensity set point potential Vsu, comparator 68 having one input coupled to the output of circuit 54 with the other input coupled to the source of the intensity set point potential Vsu. The output of comparator 68 is fed to one input of register 65. A bi-directional bus 70 couples register 65 with a suitable memory 69 and with digital-to-analog (D/A) converter 66. Memory 69 stores the words representing each specific correction signal for each n segment of the scan line for access during image scanning to control modulator power and maintain the intensity of write beam 13' substantially constant. Memory 69 is connected to D/A 66 for input to the intensity control port of pulse modulating circuit 47.

A suitable control logic 72 is provided for controlling the direction of bus 70. Additionally, logic 72 controls the address and read/write lines of memory 69 through a control line 67. Control logic 72 also has page (PAGE SYNC)) and image line (LINE SYNC) synchronizing signal inputs to enable interdocument gap 53, the white or calibration lines, and start of each image line to be identified for each image page. Synchronizing clock signals from pixel clock 50 are input to logic 72 to synchronize operation of the components with each other and with the image signal input.

During calibration, for each n segment of the line, register 65 outputs a digital word 1000 . . . 0 having a total of m bits, with the most significant bit (MSB) being a trial bit for comparison purposes. The word is the converted into a voltage by D/A 66 which is operated in the unipolar mode aso that the selected word 1000 . . . 0 produces an intensity correction signal Vcnt having a voltage that is one-half the maximum Vcnt. Modulator 15, modulator driver 30, pulse modulation circuit 47, and photodetector 40 operate as previously described. After the time delay required for modulator 15 to process the signal, the current beam intensity signal Vi, which is the difference between black line intensity signal Vb and the instantaneous white line intensity signal Vw output by photodetector 40 is compared to the intensity adjustment potential Vsu. The compared signal is used by register 65 to set the trial bit MSB as follows:

if Viwb > Vsu, MSB = 0
if Viwb < Vsu, MSB = 1

This cuts the range of possible values for the intensity correction signal Vcnt in half. After the MSB has been set, the next most significant bit MSB−1 is used as a trial bit. The digital word presented to D/A 66 by register 65 is now either 0100 . . . 0 or 1100 . . . 0 depending on the outcome of the first MSB comparison. After the time delay required by modulator 15 to operate, Vi and Vsu are compared and the MSB−1 bit is reset as follows:

if Viwb > Vsu, MSB 1 = 0
if Viwb < Vsu, MSB 1 = 1

The foregoing process is repeated until all m bits of the word have been set. The word that results and which now represents the voltage of the intensity correction signal Vcnt−1 that will provide the desired writing beam intensity for the first segment of the scan line is stored in memory 69. The entire process is then repeated n times to identify and store a word for each n segment of the scan line. When calibration is completed, there results a series of words representing voltages for the intensity correction signals Vcnt−1, Vcnt−2, . . . Vcnt−n that will give the desired writing beam intensity for each n segment of the scan line.

While a polygon based scanning system is illustrated and described herein, other types of scanning systems such as holographic may be envisioned.

While the invention has been described with reference to the structure disclosed, it is not confined to the details set forth, but is intended to cover such modifications or changes as may come within the scope of the following claims.

We claim:

1. The method for stabilizing the intensity of a light beam source in a scanner having a recording member, modulating means for modulating the light beam to provide non-writing and writing beams in accordance with image signals, an rf power source for said modulating means, and means for scanning the writing beam across the recording member to expose the recording member and write images thereon page by page in conformance with the image signals, comprising the steps of:
   a. detecting the intensity of said light beam during scanning of said writing beam to provide an intensity signal by
      1. detecting the intensity of said non-writing beam output by said modulating means in between successive image pages on said recording member to provide a first intensity signal;
      2. storing said first intensity signal;
      3. detecting the intensity of said non-writing beam output by said modulating means during writing of images by said writing beam to provide a second intensity signal; and
      4. differencing said first and second intensity signals to provide said intensity signal;
   b. comparing said intensity signal with a preset beam intensity setpoint signal to provide an intensity correction signal; and
   c. combining said intensity correction signal with said image signals to continuously adjust said rf power source for said modulating means so as to maintain uniform diffraction efficiency of said modulating means while modulating said beam in accordance with said image signals.

2. The method according to claim 1 including the steps of:
   a. detecting the intensity of said non-writing beam while said writing beam is writing at least one non-image line of an image page to provide said second intensity signal;
   b. differencing said first and second intensity signals to provide a difference signal;
   c. comparing said difference signal with said preset beam intensity setpoint signal to provide said intensity correction signal;
   d. storing said intensity correction signal; and
   e. when writing images, combining said intensity correction signal with said image signals to thereby adjust said rf power source for said modulating means so as to maintain uniform diffraction efficiency while modulating said beam in accordance with said image signals.

3. The method according to claim 1 including the steps of:
   a. detecting said second intensity signal while scanning at least one non-image line of an image page;
   b. differencing said first and second intensity signals to provide a difference signal;
   c. comparing said difference signal with said preset beam intensity setpoint control voltage to provide a control signal;
   d. inputting said control signal to a successive approximation means for determining by approximation said intensity correction signal required to compensate for changes in beam intensity; and
   e. combining said intensity correction signal with said image signal to thereby adjust said rf power source for said modulating means so as to maintain uniform diffraction efficiency while modulating said beam in accordance with said image signals.

4. In a raster output printer having a moving xerographic recording member on which images are formed in accordance with an input of image signals, means for charging said recording member in preparation for imaging, a high intensity beam, means for modulating said beam in accordance with said image signal input to provide a recording beam and a non-recording beam, a rf power source for said modulating means, and means for scanning said recording beam across said recording member to expose said recording member and create said images, the method of stabilizing the intensity of said beam by controlling said rf power source and the rf power to said modulating means to maintain uniform diffraction efficiency of said modulating means despite changes in beam intensity, comprising the steps of:

a. detecting the intensity of said beam during scanning to provide an intensity signal by
 1. detecting the intensity of said non-recording beam in between images on said recording member to provide a first intensity signal;
 2. storing said first intensity signal;
 3. detecting the intensity of said non-recording beam during imaging to provide a second intensity signal; and
 4. differencing said first and second intensity signals to provide said intensity signal;

b. comparing said intensity signal with a preset beam intensity setpoint potential to provide an intensity correction signal; and c. combining said intensity correction signal with said image signals to said modulating means to continuously adjust said rf power source and the rf power for said modulating means so as to maintain uniform diffraction efficiency while modulating said beam in accordance with said image signals.

5. The method according to claim 4 including the steps of:
a. detecting said second intensity signal while scanning at least one non-image calibration line;
b. differencing said first and second intensity signals to provide a difference signal;
c. comparing said difference signal with said preset beam intensity setpoint potential to provide said intensity signal;
d. storing said intensity signal; and
e. during imaging, combining said intensity signal with said image signals to thereby adjust said rf power source and the rf power for said modulating means so as to maintain uniform diffraction efficiency while modulating said beam in accordance with said image signals.

6. The method according to claim 4 including
a. detecting said second intensity signal while scanning at least one non-image calibration line;
b. differencing said first and second intensity signals to provide a difference signal;
c. comparing said difference signal with said preset beam intensity setpoint potential to provide a control signal;
d. inputting said control signal to a successive approximation means for determining by approximation the intensity signal required to compensate for changes in beam intensity; and
e. combining said intensity signal with said image signals to thereby adjust said rf power source and the rf power for said modulating mens so as to maintain uniform diffraction efficiency while modulating said beam in accordance with said image signals.

7. The method according to claim 4 including the steps of:
adjusting said preset beam intensity setpoint potential in response to the operating condition of said printer.

8. The method according to claim 7 including the steps of:
a. monitoring the charge level of said recording member; and
b. adjusting said preset beam intensity setpoint potential to maintain said recording member charge level substantially constant.

9. Apparatus for maintaining a modulator of a raster output scanner at substantially uniform diffraction efficiency despite changes in beam intensity, said scanner including a source of a high intensity recording beam for input to said modulator, a recording member on which images are produced by scanning in response to an image signal input to said modulator, and scanning means for scanning the image beam output of said modulator across said recording member to expose said recording member and produce images thereon, said modulator having a rf power source providing rf power for driving said modulator with means to actuate said rf power source in response to said image signal input whereby said modulator outputs said imaging beam for exposing said recording member to provide images thereon, comprising, in combination:

a. beam intensity detecting means for detecting the intensity of said beam, said beam intensity detecting means producing an intensity signal representative of beam intensity;
b. means providing a preset intensity setpoint potential;
c. comparator means for comparing said intensity signal with said preset intensity setpoint potential to provide a correction signal; and
d. circuit means for combining the image signal input with said correction signal to provide a modified image signal input which both regulates said rf power source to maintain the rf power to said modulator substantially constant in spite of changes in beam intensity and controls said modulator to modulate said beam in accordance with said image signal input, said modulator producing at least zero order and first order beams in response to said image signal input;

one of said zero order and first order beams comprising said imaging beam;

said beam intensity detecting means including a sensor in the path of the other of said zero order and first order beams to provide said intensity signal, said beam intensity detecting means including means for storing the signal output of said sensor between images; and means for differencing the stored signal output of said sensor from the signal output of said sensor during scanning.

10. Apparatus according to claim 1 including
control means for actuating said beam intensity detecting means to detect the intensity of said beam between images and provide a first intensity level signal;
means for storing said first intensity level signal;
said control means actuating said intensity detecting means to detect the intensity of said beam while said beam is scanning a uniformly non-image area of said image to provide a second intensity level signal; and
means for differencing said first and second intensity level signals to provide said intensity signal.

* * * * *